(12) United States Patent
Wechsler

(10) Patent No.: US 11,320,297 B2
(45) Date of Patent: May 3, 2022

(54) SINGLE-ENDED MULTI-CAVITY MEASURING SCOOP

(71) Applicant: Samuel Wechsler, Delmar, NY (US)

(72) Inventor: Samuel Wechsler, Delmar, NY (US)

( * ) Notice: Subject to any disclaimer, the term of this patent is extended or adjusted under 35 U.S.C. 154(b) by 0 days.

(21) Appl. No.: 17/175,133

(22) Filed: Feb. 12, 2021

(65) Prior Publication Data

US 2021/0247222 A1     Aug. 12, 2021

Related U.S. Application Data

(60) Provisional application No. 62/975,271, filed on Feb. 12, 2020.

(51) Int. Cl.
*G01F 19/00*     (2006.01)
*A47G 21/04*     (2006.01)

(52) U.S. Cl.
CPC ........... *G01F 19/002* (2013.01); *A47G 21/04* (2013.01)

(58) Field of Classification Search
CPC .............................. G01F 19/002; A47G 21/04
See application file for complete search history.

(56) References Cited

U.S. PATENT DOCUMENTS

| | | | | |
|---|---|---|---|---|
| 2,654,252 | A * | 10/1953 | Davis | A47G 21/04 73/426 |
| 6,895,672 | B2 * | 5/2005 | Conforti | A47J 43/288 15/236.01 |
| 9,521,930 | B2 * | 12/2016 | Gattineri | A47J 43/288 |
| 10,583,061 | B2 * | 3/2020 | Pathak | G05B 15/02 |
| D891,275 | S * | 7/2020 | Wechsler | D10/46.3 |
| 2011/0219631 | A1 * | 9/2011 | Hou | A47G 21/02 30/322 |
| 2017/0089565 | A1 * | 3/2017 | Vann | A47G 21/02 |

* cited by examiner

*Primary Examiner* — Jamel E Williams
(74) *Attorney, Agent, or Firm* — Heslin Rothenberg Farley & Mesiti P.C.

(57) ABSTRACT

Embodiments of the present invention include measuring apparatuses, method of use of the apparatuses, and methods of manufacture. A measuring apparatus may include, for example, a scoop portion joined to a handle portion, wherein the scoop portion and the handle portion are either separate elements connected to each other or contiguous regions on a piece of a material comprising the measuring apparatus, the scoop portion comprising a top surface and a bottom surface. The scoop portion may comprise two or more cavities, where each cavity is a concave indentation in either the top surface or the bottom surface, and where each cavity is formed to accommodate a pre-defined volume of a substance to be measured.

14 Claims, 14 Drawing Sheets

1500

1510 — OBTAIN A MEASURING APPARATUS THAT INCLUDES A SCOOP PORTION AND A HANDLE PORTION, GRIP THE MEASURING APPARATUS BY THE HANDLE PORTION, WHERE THE SCOOP PORTION INCLUDES TWO OR MORE CAVITIES, EACH CAVITY HAVING BEEN CONFIGURED TO ACCOMMODATE A SPECIFIC VOLUME OF A MATERIAL

1520 — MOVE THE SCOOP PORTION INTO A MATERIAL SUCH THAT AT LEAST ONE OR MORE OF THE TWO OR MORE CAVITIES IS FILLED WITH THE MATERIAL

1530 — EMPTY THE CONTENTS OF THE AT LEAST ONE OF THE TWO OF MORE CAVITIES INTO A RECEPTACLE

1610 — OBTAIN A MEASURING APPARATUS THAT INCLUDES A SCOOP PORTION AND A HANDLE PORTION, GRIP THE MEASURING APPARATUS BY THE HANDLE PORTION, WHERE THE SCOOP PORTION INCLUDES TWO OR MORE CAVITIES, EACH CAVITY HAVING BEEN CONFIGURED TO ACCOMMODATE A SPECIFIC VOLUME OF A MATERIAL

1620 — PLACE THE MEASURING APPARATUS ON A SURFACE WHERE ONE OR MORE OF THE TWO OR MORE CAVITIES ARE ACCESSIBLE FROM THE SURFACE

1630 — FILL THE ACCESSIBLE ONE OR MORE OF THE TWO OR MORE CAVITIES WITH A MATERIAL, BASED ON POURING THE MATERIAL INTO THE ONE OR MORE OF THE TWO OR MORE CAVITIES

1640 — EMPTY THE CONTENTS OF THE ACCESSIBLE ONE OR MORE OF THE TWO OR MORE CAVITIES INTO A RECEPTACLE

FIG. 16

SINGLE-ENDED MULTI-CAVITY MEASURING SCOOP

CROSS REFERENCE TO RELATED APPLICATIONS

This application claims priority from U.S. provisional patent application No. 62/975,271, filed Feb. 12, 2020, entitled, "SINGLE-ENDED MULTI-CAVITY MEASURING SCOOP," which is hereby incorporated herein by reference in its entirety for all purposes.

BACKGROUND OF INVENTION

When cooking or otherwise preparing food or other types of mixtures, it is desirable to conserve movements as well as to utilize various implements more than once. This conservation translates to efficiency in food preparation as well as conservation in resources in cleaning up after food preparation.

SUMMARY OF INVENTION

To increase efficiencies related to food preparation and cleanup after preparation, it is desirable to utilize examples of the apparatus disclosed herein, which include but are not limited to, a scoop with multiple cavities in one end of the scoop.

It is desirable to measure with multiple cavities on one end of a scoop because in addition to conserving movements and natural resources used in food preparation, precise measurements may also be achieved. As described in greater detail herein, certain examples of methods of use for example, the apparatuses of the present invention include sticking a scoop, as described herein, with more than one measuring cavity into one or more materials to get the material only into one cavity. Utilizing the examples herein, one may utilize a scoop of embodiments of the present invention to measure, utilizing any number of cavities within the scoop.

Shortcomings of the prior art are also overcome and additional advantages are provided through a measuring apparatus. The measuring apparatus includes: a scoop portion joined to a handle portion, where the scoop portion and the handle portion are either separate elements connected to each other or contiguous regions on a piece of a material comprising the measuring apparatus, the scoop portion comprising a top surface and a bottom surface; and the scoop portion comprising two or more cavities, where each cavity is a concave indentation in either the top surface or the bottom surface, and where each cavity is formed to accommodate a pre-defined volume of a substance to be measured.

In some examples, the two or more cavities comprise a first cavity and a second cavity, the first cavity formed to accommodate a teaspoon of the substance to the measured, and the second cavity formed to accommodate a tablespoon of the substance to be measured.

In some examples, the scoop portion comprises a first end and a second end and a longitudinal axis connecting the first end to the second end, and the first cavity and the second cavity are centered around the longitudinal axis.

In some examples, the measuring apparatus comprises at least one material selected from the group consisting of: plastic, silicone, metal, wood, and ceramic.

In some examples, the handle portion comprising a top surface and a bottom surface and a longitudinal axis between them, and the handle portion further comprises a hole through parallel portions of the top surface of the handle and the bottom surface of the handle.

In some examples, the hole is sized to measure a portion size of an item, based on placing the item through the hole.

In some examples, the scoop portion comprises a spatula.

In some examples, the handle portion is joined to the scoop portion along a central axis of the spatula, the two or more cavities comprise two cavities, and a first cavity of the two or more cavities is on a left side of the central axis of the spatula and where a second cavity of the one or more cavities is on a right side of the central axis of the spatula.

In some examples, the two or more cavities comprise concave indentations in the top surface, and where the bottom surface of the scoop portion comprises convex portions at locations of the two or more cavities.

In some examples, the scoop portion and the handle portion are the separate elements connected to each other, the scoop portion comprises an opening, and the handle element is inserted into the opening and affixed inside the opening to join the scoop portion and the handle portion.

In some examples, the handle element is affixed utilizing a material selected from the group consisting of: glue, epoxy, a fastener.

In some examples, the apparatus comprises contiguous regions on the piece of the material, and a portion of the top surface of the scoop portion and a portion of the bottom surface of the scoop portion are parallel to each other.

In some examples, the first cavity is an indentation in the top surface of the scoop portion and the second cavity is an indentation in the bottom surface of the scoop portion.

In some examples, the first cavity is an indentation in the bottom surface of the scoop portion and the second cavity is an indentation in the bottom surface of the scoop portion.

In some examples, the first cavity is an indentation in the top surface of the scoop portion and the second cavity is an indentation in the top surface of the scoop portion.

Shortcomings of the prior art are also overcome and additional advantages are provided through the provision of a method of utilizing a measuring apparatus. The method includes: obtaining a measuring apparatus, the measuring apparatus comprising: a scoop portion joined to a handle portion, where the scoop portion and the handle portion are either separate elements connected to each other or contiguous regions on a piece of a material comprising the measuring apparatus, the scoop portion comprising a top surface and a bottom surface; and the scoop portion comprising two or more cavities, where each cavity is a concave indentation in either the top surface or the bottom surface, and where each cavity is formed to accommodate a pre-defined volume of a substance to be measured; holding the measuring apparatus by the handle portion; based on the holding, moving the scoop portion into a material such that at least one or more of the two or more cavities is filled with the material; and emptying the material filling the at least one of the two of more cavities into a receptacle.

Shortcomings of the prior art are also overcome and additional advantages are provided through a measuring apparatus. The measuring apparatus includes: a scoop portion joined to a handle portion, the scoop portion comprising a top surface and a bottom surface; and the scoop portion comprising two cavities, where each cavity is a concave indentation in either the top surface or the bottom surface, where each cavity is formed to accommodate a pre-defined volume of a substance to be measured, where a pre-defined volume of the first cavity is different than a pre-defined volume of a second cavity.

In some examples of the measuring apparatus, the predefined volume of the first cavity is a teaspoon.

In some examples of the measuring apparatus, the predefined volume of the first cavity is a tablespoon.

Apparatuses, methods of manufacture, and methods of use relating to one or more aspects of the technique and apparatus are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 15 is a workflow that depicts various aspects of some embodiments of the present invention.

FIG. 16 is a workflow that depicts various aspects of some embodiments of the present invention.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Embodiments of the present invention include a measuring apparatus that enables the parallel measurement of at least two different volumes at a given time. As will be described in greater detail herein, some examples of the measuring apparatus include a handle portion attached to a scoop portion. The scoop portion includes at least two cavities that are sized to measure specific volumes. For example, in some embodiments with two cavities, the volumes may include a first volume equivalent to a teaspoon and a second volume equivalent tablespoon, respectively. The cavities can each be filled separately, although they are both cavities in the scoop portion of the measuring apparatus. In some examples, the handle portion includes a hole, through which a loop can be threaded, allowing for ease of storage of the measuring apparatus. As will be discussed herein, the hole can also be utilized as a holding mechanism or a measuring mechanism for a dry ingredient in a recipe being prepared utilizing the cavities to measure either wet or dry ingredients. As discussed herein, various materials can be used to form the measuring apparatus and various methods of manufacture can be employed to form the measuring apparatus. Materials forming various examples of the measuring apparatus may include, but are not limited to plastic, silicone, metal, wood, and/or ceramic. Method of manufacture utilized to form examples of the measuring apparatus disclose herein include, but are not limited to, three dimensional (3D) printing, milling, sintering, stamping, bending, casting, forging, and/or injection molding.

Figure 1:
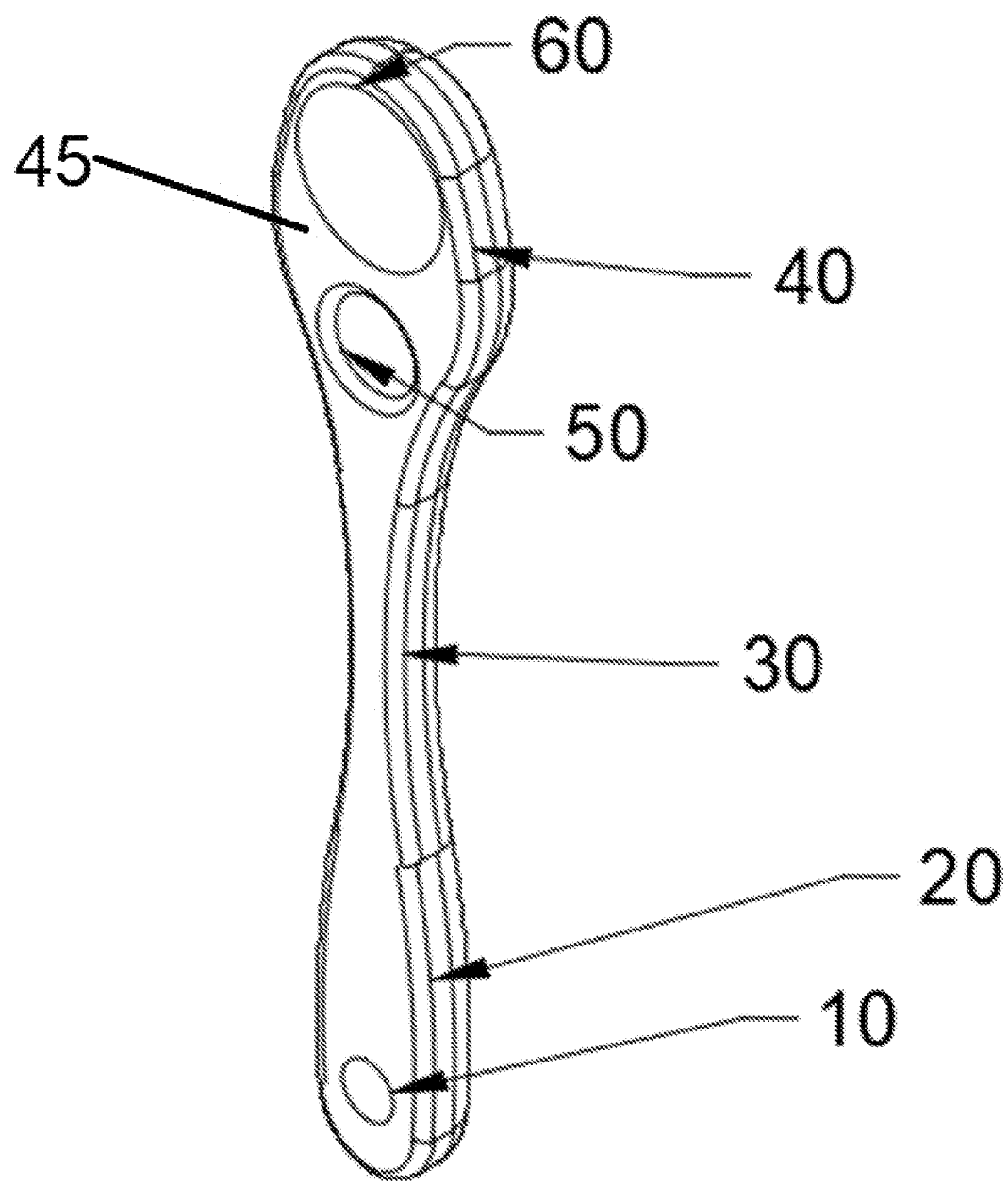
FIG. 1 depicts various aspects of some embodiments of the present invention.

Referring to FIG. 1, FIG. 1 is an illustration of aspects of some embodiments of a measuring apparatus 30 of the present invention. In this example, the measuring apparatus 30 comprises a continuous piece of material (plastic, silicone, metal, wood, ceramic, etc.) where the continuous piece can be understood as comprising two portions: a handle portion 20 and a scoop portion 40. The shape of the measuring apparatus 30 in FIG. 1 is provided as an example, only, as the measuring apparatus disclosed herein can be configured n a variety of different shapes. However, returning to the example of FIG. 1, the handle portion 20 of the measuring apparatus 30 comprises a hole 10. The hole 10 extends through a top surface 45 and a bottom surface 35 of the measuring apparatus 30. Accessible from the top surface 45 of the measuring apparatus 30, in the scoop portion 40, are two cavities configured to hold different volumes of material. These cavities do not extend the whole way through the measuring apparatus 30, unlike the hole 10, Rather, a first cavity 50 and a second cavity 60, in this example, are sized to hold specific, differing, volumes. Thus, the first cavity 50 can be utilized to measure a first volume, while the second cavity 60, can be utilized (in parallel and/or asynchronously) to measure a second volume. The first volume and the second volume can comprise the same or differing volumes. In one example, the first cavity 50 can be utilized to measure a teaspoon while the second cavity 60, can be utilized in parallel or asynchronously to measure a tablespoon 60. The first cavity 50 and the second cavity 60 (and any additional cavities as this example provides two cavities for illustrative purposes only and not to introduce any limitations) may be on the same plane, so that they break the same plane, or they may be on opposing planes, to break different planes, or may break any plane or planes, in different embodiments of the present invention. An individual utilizing the measuring apparatus 30 can utilize the hole 10 to hang the measuring apparatus 30, for example, on a hook and/or other fastener (not pictured). The hole 10 can also be utilized as a holder for an ingredient in a recipe being prepared utilizing the measuring apparatus 30. For example, the hole 10 can be utilized to measure or hold a specific amount of a given ingredient. The hole can be configured to accommodate a serving of pasta (e.g., spaghetti, linguine, angel hair, etc.). A user can utilize the hole 10 to measure a serving size of pasta and utilize one or more of the cavities 50, 60 to measure various ingredients to combine with the pasta in a meal. Pasta is merely one example of a dry ingredient that can be measured (e.g., apportioned) utilizing the hole 10.

Figure 2:
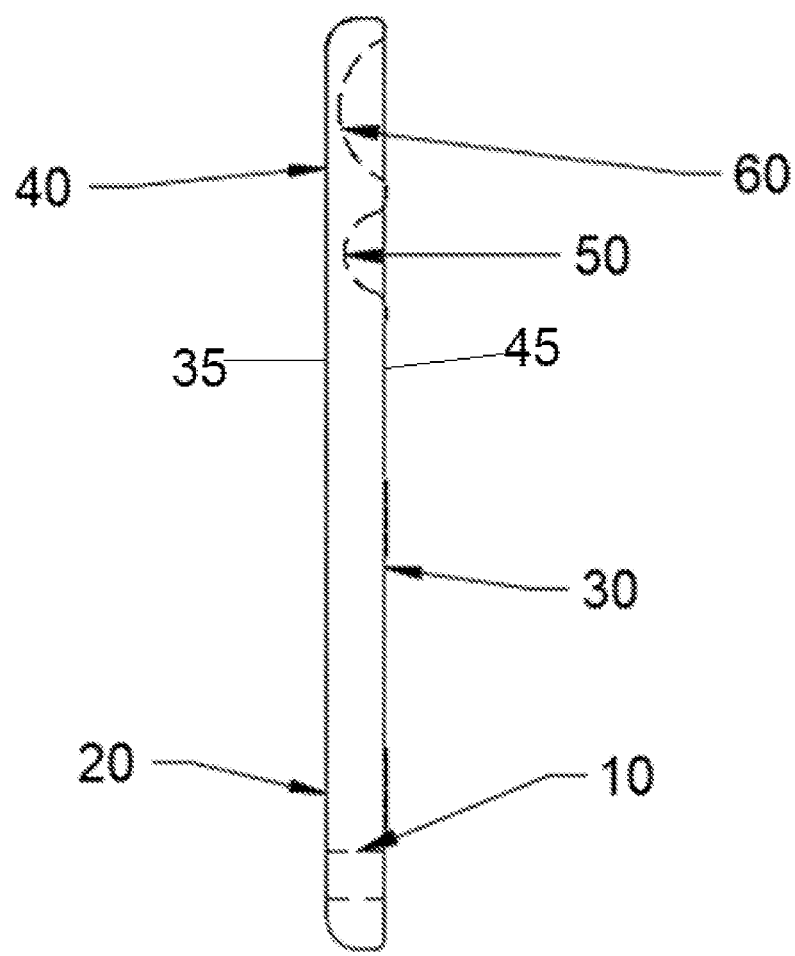
FIG. 2 provides an alternative view of various aspects of some embodiments of the present invention.

FIG. 2 provides a side view of the measuring apparatus 30 illustrated in FIG. 1. As is visible from this view, the top surface 45 and the bottom surface 35 of the measuring apparatus 30 are mostly parallel to each other, save the cavities, the first cavity 50 and the second cavity 60. The first cavity 50 and the second cavity 60 (which are examples as the measuring apparatus disclosed herein may include more than two cavities), are located on the scoop portion 40 of the measuring apparatus 30. The handle portion 20 includes a hole 10 that is through the top surface 45 and the bottom surface 35, the center of the hole 10 being on an axis parallel to the top surface 45 and the bottom surface 35. Although the hole 10 is pictures as being circular in shape, this shape is only provided as an example and not to introduce any limitations. As aforementioned, the hole 10 can be utilized to apportion a serving size of a dry ingredient. Additionally, the shape of the first cavity 50 and the second cavity 60 are pictured as concave recesses in the measuring apparatus 30 that are oval or circular. However, this is just one example of possible shapes for these cavities 50, 60 or recesses. The shapes of the cavities can vary provided that each cavity can be filled with a distinct volume of material (liquid, granular medium, etc.).

Figure 3:
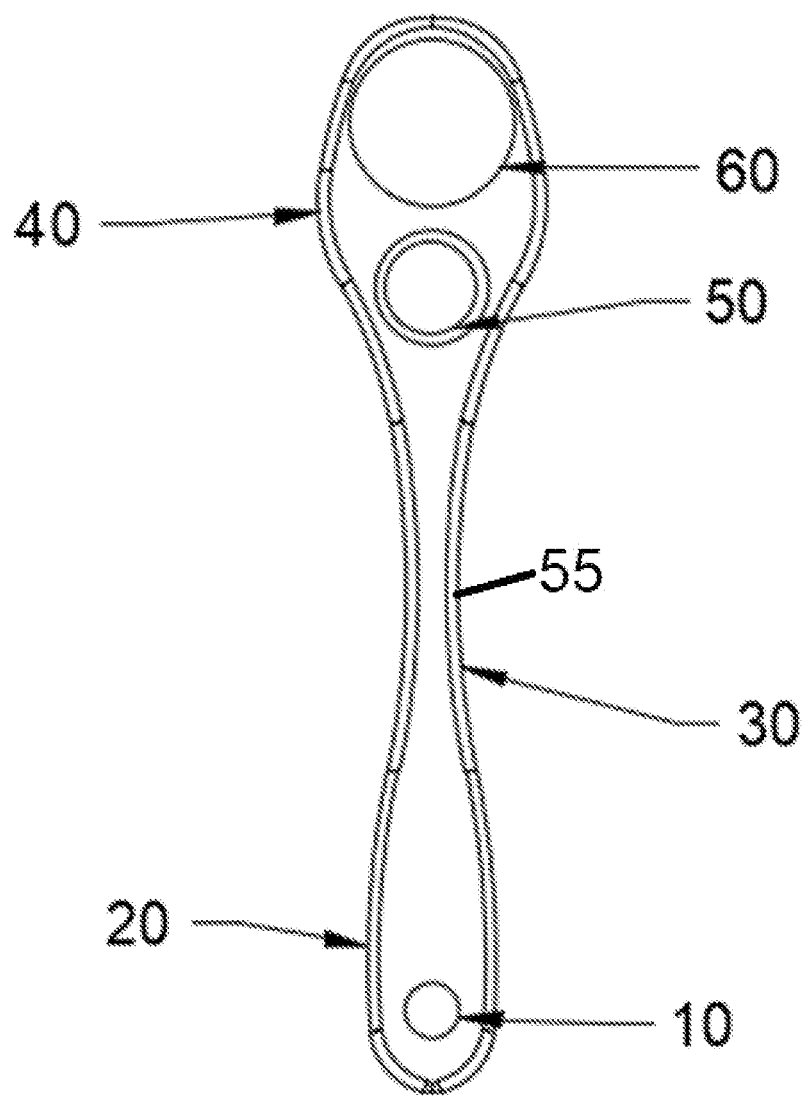
FIG. 3 provides another alternative view of various aspects of some embodiments of the present invention.

FIG. 3 is a view of an example of the measuring apparatus 30 disclosed herein shown from the top surface 45. In some examples of the measuring apparatus 30, a portion 55 of the measuring apparatus 30 connecting the handle portion 20 to the scoop portion 40, is narrower than the rest of the measuring apparatus 30. This narrower portion 55 is useful when grabbing the measuring apparatus 30, for ease of use. Although the narrower portion 55, and the scoop portion 40, can be understood as different parts of the measuring apparatus 30, they can be formed from a contiguous piece of material. Hence, in some examples, rather than being distinct areas, there are overlaps between these portions. In the pictured example, which is provided for illustrative purposes only and not to introduce any limitations, the first cavity 50 accommodates a volume of a teaspoon, while the second cavity 60 accommodate the volume of a tablespoon. As demonstrated in FIG. 3, because it is clearly viewable from the top surface 45, the first cavity 50 and the second cavity 60 are spaced such that they can be filled in parallel and/or asynchronously. A user can fill one of more of the cavities 50, 60, while holding the handle portion 20, of the measuring apparatus. Thus, while gripping at a single location, a user can fill one or more of the cavities 50, 60, which increases efficiencies with which the user can measure materials in activities including but not limited to, cooking. As aforementioned, the handle portion 20 has a hole 10. As aforementioned, the hole 10 can be utilized to apportion a serving size of a dry ingredient.

Figure 4:
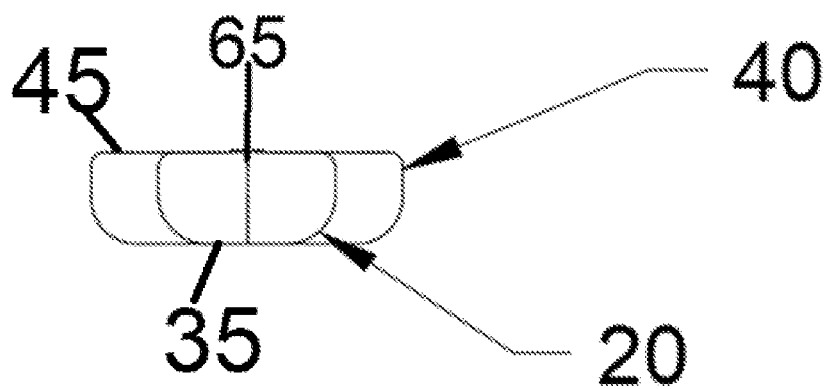
FIG. 4 depicts various aspects of some embodiments of the present invention.
Figure 5:
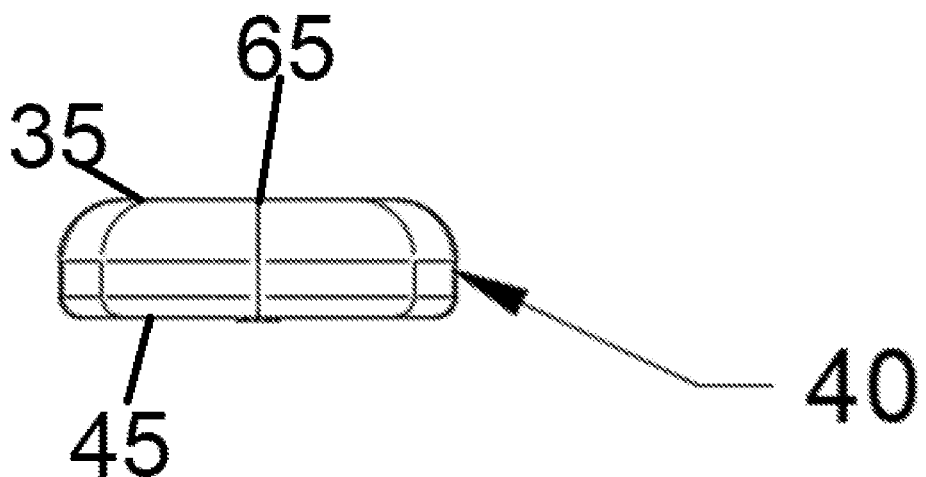
FIG. 5 depicts various aspects of some embodiments of the present invention.

FIG. 4 provides a side view of an example of a measuring apparatus 30 disclosed herein. This view shows a differential between a width of a scoop portion 40 and a handle portion 20. In this example, this differential can be understood as advantageous in allowing a user to balance the measuring apparatus during use. The wider scoop portion 40 accommodates the cavities 50, 60 while the handle portion 20 is narrower than the wider scoop portion 40. In this example, but not in all examples, the hole and the two cavities are both centered on a longitudinal axis 65. The orientation of FIG. 4 has the top surface 65 facing up and the bottom surface 45 facing down. Meanwhile, FIG. 5 has the opposite longitudinal orientation and also shows the same embodiment from the other side, such that the wider, scoop portion 40, is the only aspect visible from this perspective. As aforementioned, the hole 10 can be utilized to apportion a serving size of a dry ingredient.

Figure 6:
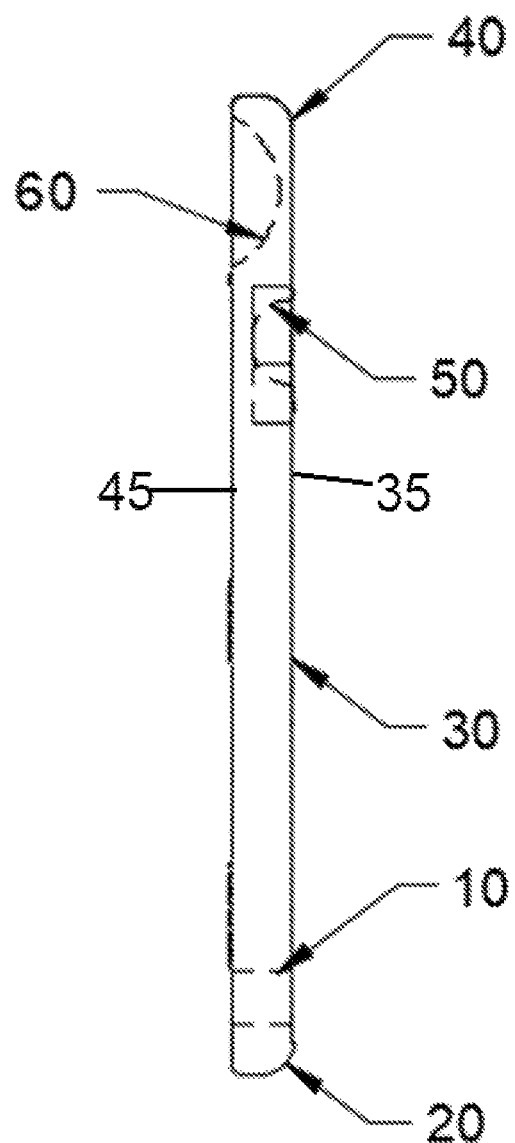
FIG. 6 depicts various aspects of some embodiments of the present invention.

FIG. 6 is an example of the measuring apparatus 30 disclosed herein, but in contrast to the embodiments of FIGS. 1-5, in FIG. 6, the first cavity 50 and the second cavity 60 are in opposing surfaces of the measuring apparatus 30. The first cavity 50 is formed as an indentation in the bottom surface 35, while the second cavity 60 is formed as an indentation in the top surface 45. The first cavity 50 and the second cavity 60, which are each configured to hold, separately, a different or the same volumetric measure of a substance, are both formed in the scoop portion 40 of the measuring apparatus 30. Because the cavity 50 and the second cavity 60 are on opposing surfaces, a user utilizing this example may utilize the cavities 50, 60 asynchronously. However, usage of the measuring apparatus 30 is efficient because a user need only grip the handle portion 20, once, and can then alternate which cavity 50, 60 the user fills with a substance, for example, while measuring ingredients when cooking and/or baking. This embodiment also include a hole 10, which can be utilized, as mentioned above, as a hanging/storage mechanism as well as to apportion a serving size of a dry ingredient. In this example, the first cavity 50, is a smaller cavity, and the second cavity 60 is a larger cavity. However, the cavities can be sized differently in other examples.

Figure 7:
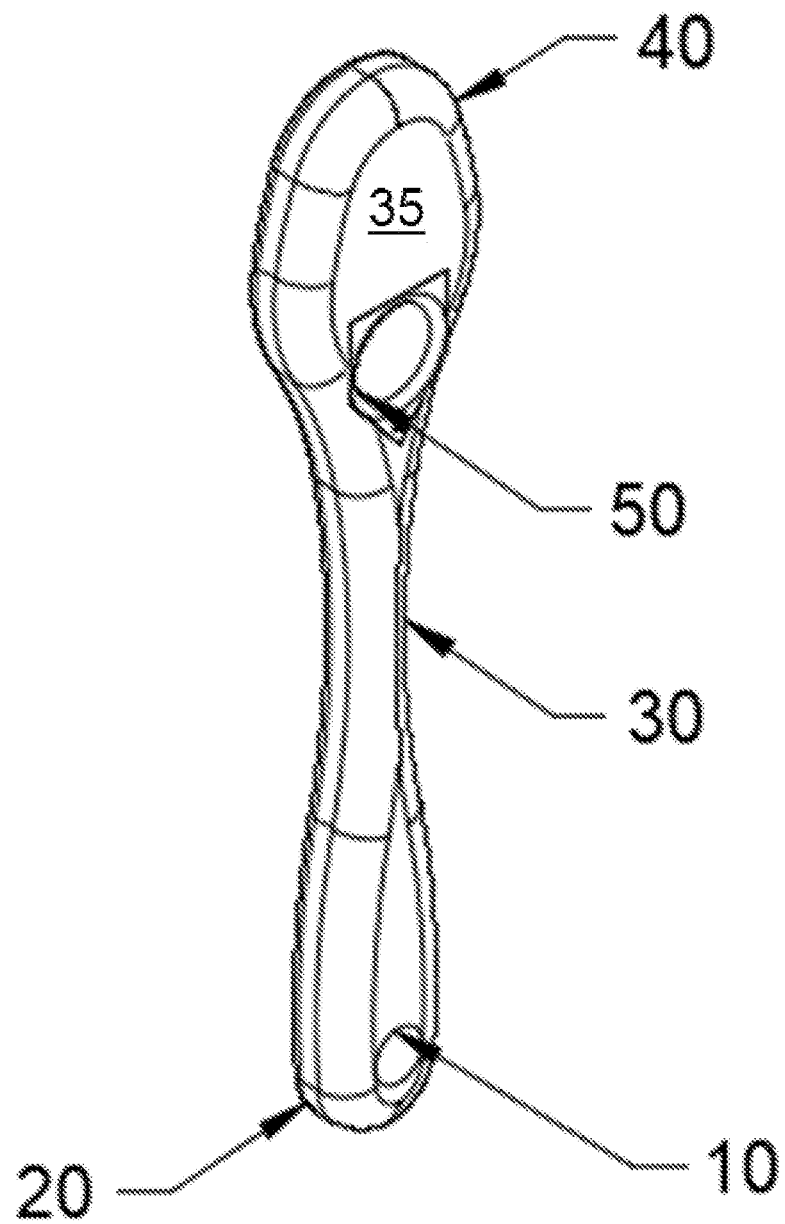
FIG. 7 provides an alternative view of various aspects of some embodiments of the present invention.
Figure 8:
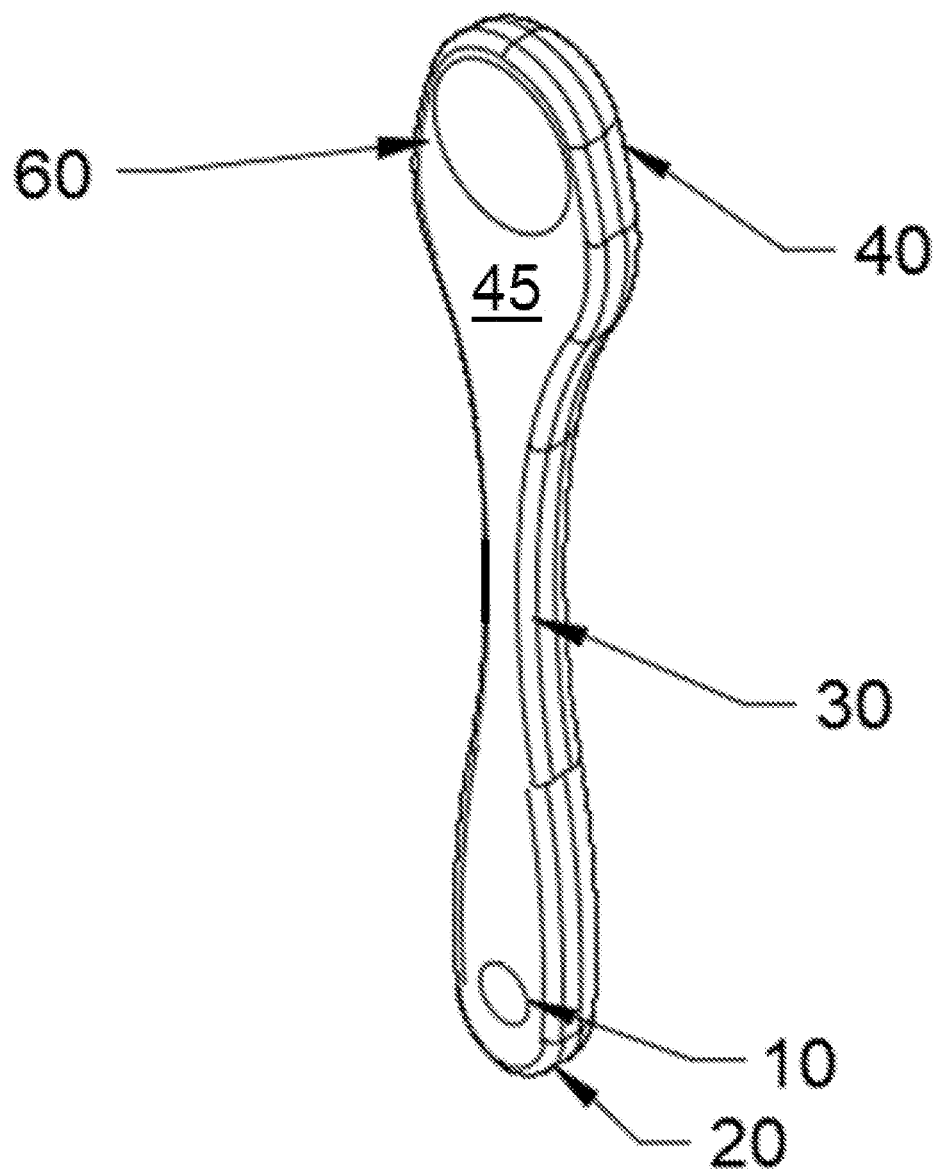
FIG. 8 provides another alternative view of various aspects of some embodiments of the present invention.

FIG. 7 and FIG. 8, like FIG. 6, illustrate an example of the measuring apparatus 30 disclosed herein, but with the cavities 50 60 on different sides or planes of the measuring apparatus 30. Turning first to FIG. 7, the measuring apparatus 30 is pictured from the bottom surface 35, such that the first cavity 50 is viewable from this view. In this example, as seen in FIG. 8, the second cavity 60 is in the top surface 45. As is evident from both perspectives, the handle portion 20 includes a hole 10, which as aforementioned can be utilized in storage and/or to apportion a dry ingredient. Based on the configuration of the scoop portion 40 in this example, the first cavity 50, which is in the bottom surface 35, is smaller than the second cavity 60, which is in the top surface 45. In some examples, the first cavity 50 can be utilized to measure a teaspoon's worth or an ingredient while the second cavity 60 is configured to measure a tablespoon's worth of an ingredient.

Figure 9:
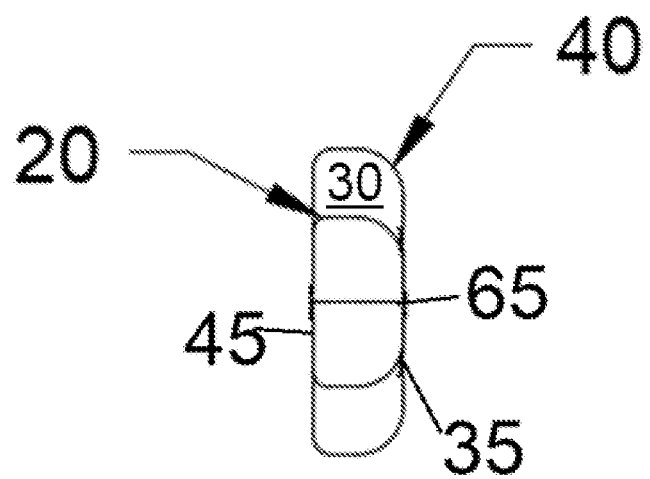
FIG. 9 provides an additional alternative view of various aspects of some embodiments of the present invention.

FIG. 9 provides a side view of an example of a measuring apparatus 30 disclosed herein. In this example, the like in FIGS. 6-8, the first cavity 50 and the second cavity 60 (not pictured in FIG. 9) are in different planes or accessible from different (opposing) surfaces of the scoop portion 40. The top surface 45 and the bottom surface 35 are depicted opposing each other and on parallel longitudinal axis. This view shows a differential between a width of a scoop portion 40 and a handle portion 20. In this example, this differential can be understood as advantageous in allowing a user to balance the measuring apparatus during use. The wider scoop portion 40 accommodates the cavities 50, 60 while the handle portion 20 is narrower than the wider scoop portion 40. In this example, but not in all examples, the hole and the two cavities are both centered on a longitudinal axis 65.

Figure 10:
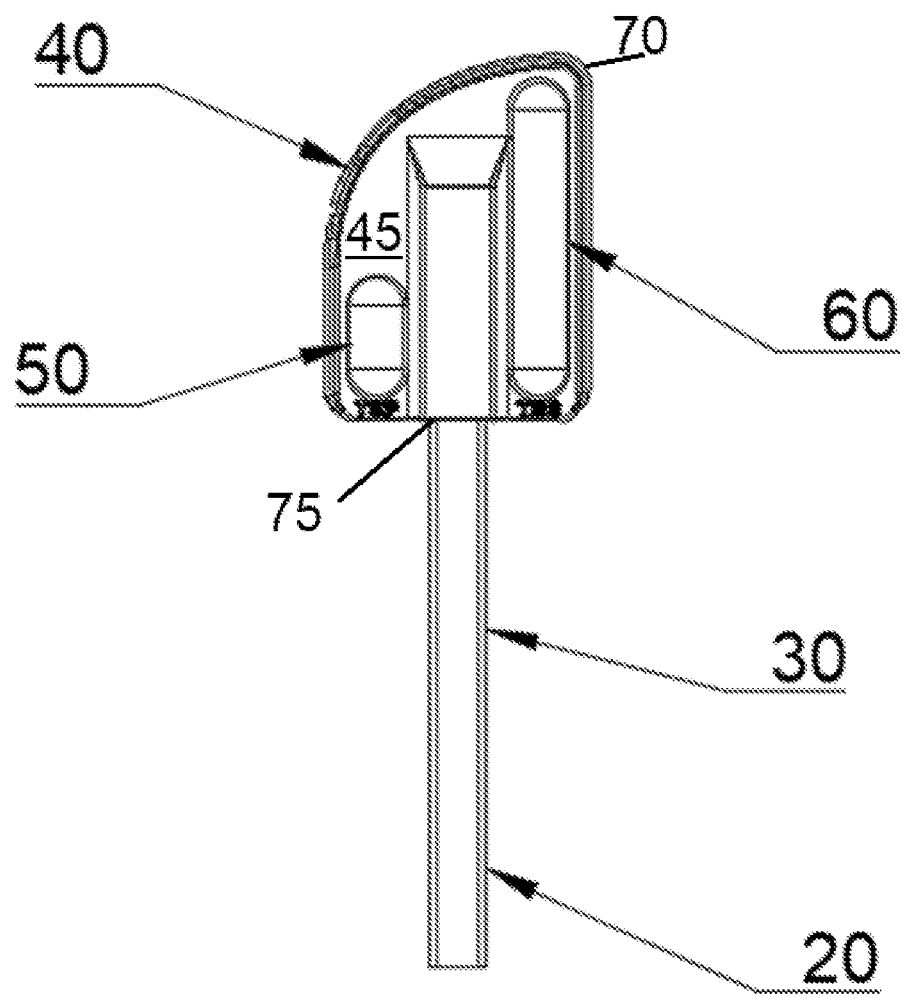
FIG. 10 depicts various aspects of some embodiments of the present invention.

FIG. 10 depicts an example of the measuring apparatus 30 disclosed herein where the scoop portion 40 includes a spatula 70. It is in the spatula 70 of the scoop portion 40 that a first cavity 50 and a second cavity 60 are formed. Unlike the examples of the measuring apparatus in FIGS. 1-9, where the scoop portion 40 and the handle portion 20 can be a contiguous material, in this example, the handle portion 20 and the scoop portion 40 are more distinct. In this example, a portion of the handle portion 20 is inserted in a central cavity 75 of the spatula 70 of the scoop portion 40. The central cavity 75 of the spatula 70 accommodates this portion of the handle portion 20 by surrounding it its top surface, bottom surface, and two opposing side surfaces. The portion of the handle portion 20 can be glued or otherwise secured into the central cavity 75 of the spatula. On either side of the central cavity 75, both accessible, in this example, from the top surface 45, are the measuring implements, the first cavity 50 and the second cavity 60. Each cavity is configured to hold a specific volume of material. In some examples, the first cavity 50 holds the volume of a teaspoon, while the second cavity 60 holds the volume of a tablespoon. This example provides the same functionality as the examples in FIGS. 1-9, but, additionally, can be utilized as a spatula. Thus, the scoop portion 40, which includes the spatula 70 (or, in some examples, is shaped in its entirety like a spatula), can be utilized to measure ingredients as well as to blend the ingredients.

Figure 11:
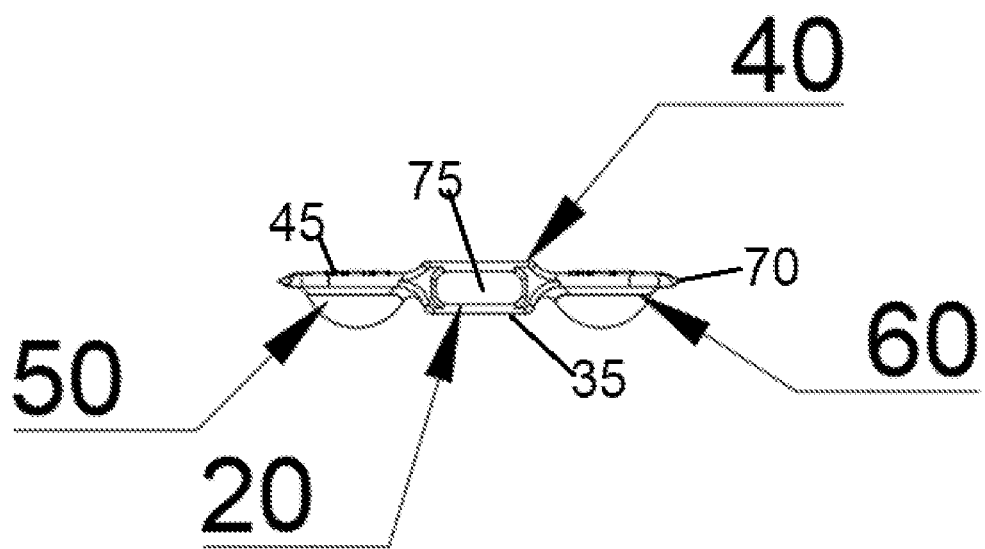
FIG. 11 provides an alternative view of various aspects of some embodiments of the present invention.

FIG. 11 shows a different view of an example of a measuring apparatus 30 similar to that in FIG. 10. Like in FIG. 10, the measuring apparatus includes a spatula 70. More readily visible in FIG. 11 is the central cavity 75, into which the handle portion 20 can be inserted and in which, the handle portion 20, is secured. Impressions are formed in the spatula 70 to accommodate the first cavity 50 and the second cavity 60 in the scoop portion 40. Because of the shape of the scoop portion 40, in this example, the bottom surface 35, which includes a bottom surface of the scoop portion 40, is not a flat plane, but, rather, convex, while the top surface 45 of the scoop portion 40 is concave where the first cavity 50 and the second cavity 60 are situated.

Figure 12:
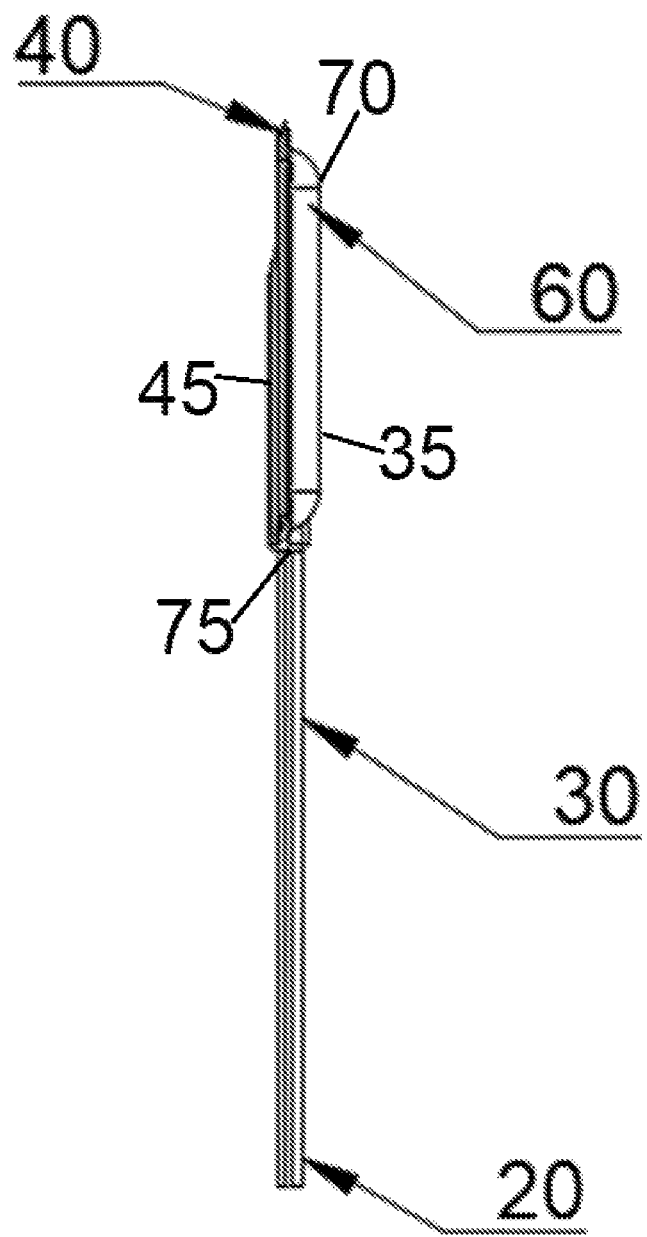
FIG. 12 provides an alternative view of various aspects of some embodiments of the present invention.
Figure 13:
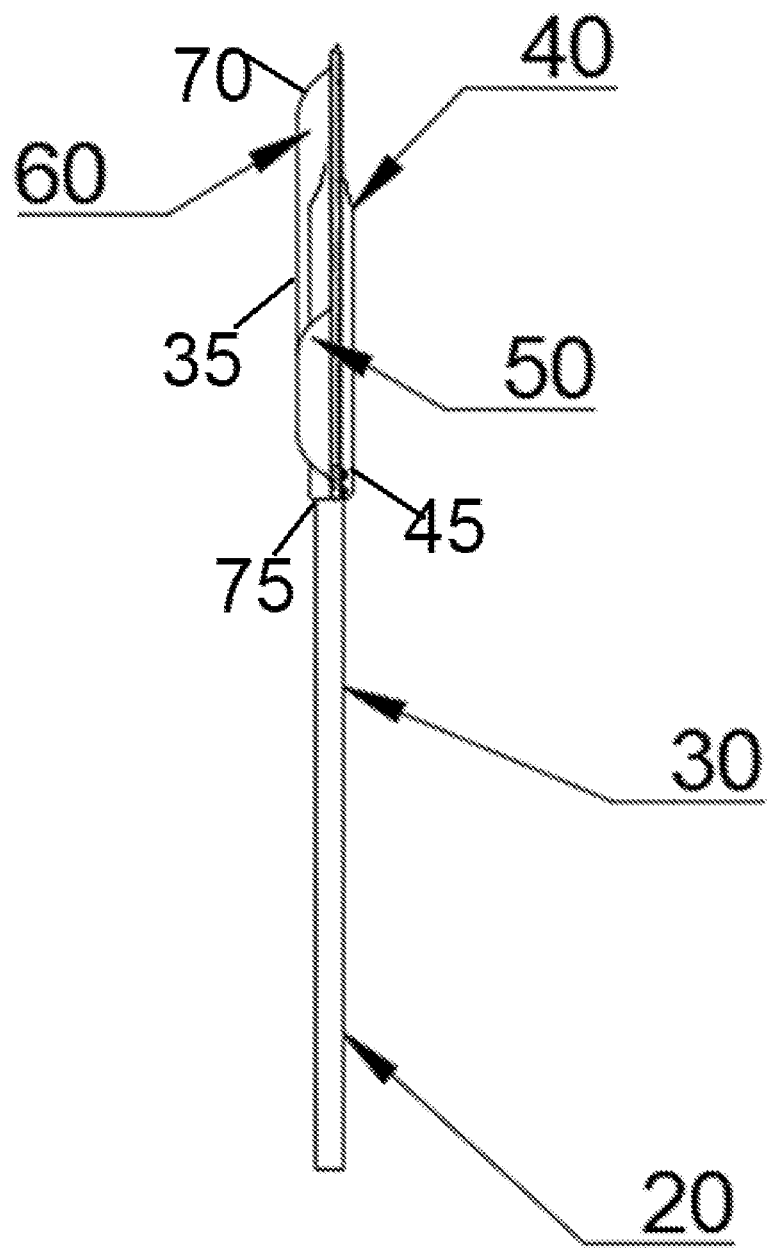
FIG. 13 provides an alternative view of various aspects of some embodiments of the present invention.
Figure 14:
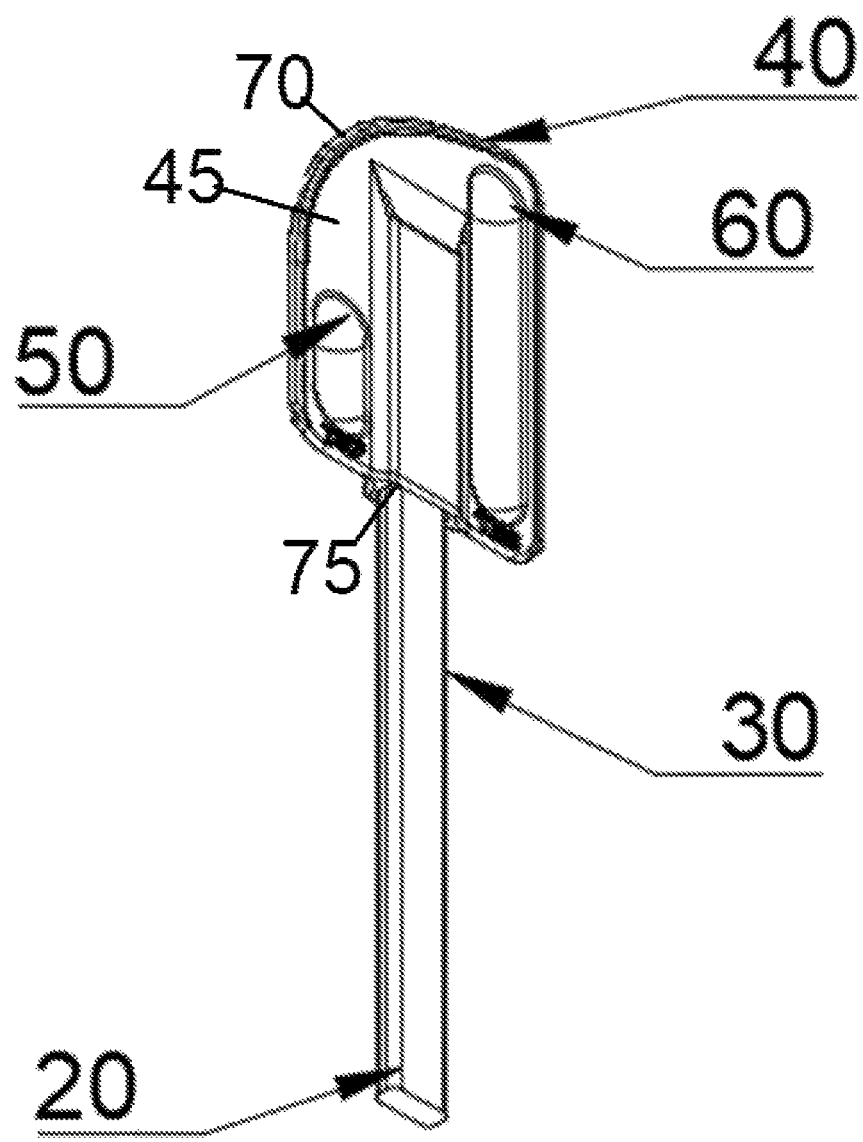
FIG. 14 provides an alternative view of various aspects of some embodiments of the present invention.

FIGS. 12-14 provide views from different vantage points of examples of the measuring apparatus disclosed herein. These examples include the spatula 70 as part of the scoop portion 40. In these examples, both the first cavity 50 and the second cavity 60 are filled from the top surface 45. However, in additional examples, one or more of the cavities 50 60 may be accessible to be filled from the bottom surface 35.

FIG. 15 is a workflow 1500 that describes a method of using an example of a measuring apparatus described herein. Referring to FIG. 15, a user obtains a measuring apparatus that includes a scoop portion and a handle portion, gripping the measuring apparatus by the handle portion, where the scoop portion includes two or more cavities, each cavity having been configured to accommodate a specific volume of a material (1510). While holding the measuring apparatus by the handle portion, the user moves the scoop portion into a material such that at least one or more of the two or more cavities is filled with the material (1520). The user empties the contents of the at least one of the two of more cavities into a receptacle (1530).

FIG. 16 is a workflow 1600 that describes a method of using an example of a measuring apparatus described herein. Referring to FIG. 16, a user obtains a measuring apparatus that includes a scoop portion and a handle portion, gripping the measuring apparatus by the handle portion, where the scoop portion includes two or more cavities, each cavity having been configured to accommodate a specific volume of a material (1610). The user places the measuring apparatus on a surface where one or more of the two or more cavities are accessible from the surface (1620). The user fills the accessible one or more of the two or more cavities with a material, based on pouring the material into the one or more of the two or more cavities (1630). The user empties the contents of the accessible one or more of the two or more cavities into a receptacle (1640).

Embodiments of the present invention include measuring apparatuses, methods of using these apparatuses, and methods of forming these apparatuses. For example, a measuring apparatus may include a scoop portion joined to a handle portion, wherein the scoop portion and the handle portion are either separate elements connected to each other or contiguous regions on a piece of a material comprising the measuring apparatus, the scoop portion comprising a top surface and a bottom surface. The scoop portion may comprise two or more cavities, wherein each cavity is a concave indentation in either the top surface or the bottom surface, and wherein each cavity is formed to accommodate a pre-defined volume of a substance to be measured.

In some examples, the two or more cavities comprise a first cavity and a second cavity, the first cavity formed to accommodate a teaspoon of the substance to the measured, and the second cavity formed to accommodate a tablespoon of the substance to be measured.

In some examples, the scoop portion comprises a first end and a second end and a longitudinal axis connecting the first end to the second end, and the first cavity and the second cavity are centered around the longitudinal axis.

In some examples, the measuring apparatus comprises at least one material selected from the group consisting of: plastic, silicone, metal, wood, and ceramic.

In some examples, the handle portion comprising a top surface and a bottom surface and a longitudinal axis between them, and the handle portion further comprises a hole through parallel portions of the top surface of the handle and the bottom surface of the handle.

In some examples, the hole is sized to measure a portion size of an item, based on placing the item through the hole.

In some examples, the scoop portion comprises a spatula.

In some examples, the handle portion is joined to the scoop portion along a central axis of the spatula, the two or more cavities comprise two cavities, and a first cavity of the two or more cavities is on a left side of the central axis of the spatula and where a second cavity of the one or more cavities is on a right side of the central axis of the spatula.

In some examples, the two or more cavities comprise concave indentations in the top surface, and where the bottom surface of the scoop portion comprises convex portions at locations of the two or more cavities.

In some examples, the scoop portion and the handle portion are the separate elements connected to each other, the scoop portion comprises an opening, and the handle element is inserted into the opening and affixed inside the opening to join the scoop portion and the handle portion.

In some examples, the handle element is affixed utilizing a material selected from the group consisting of: glue, epoxy, a fastener.

In some examples, the apparatus comprises contiguous regions on the piece of the material, and a portion of the top surface of the scoop portion and a portion of the bottom surface of the scoop portion are parallel to each other.

In some examples, the first cavity is an indentation in the top surface of the scoop portion and the second cavity is an indentation in the bottom surface of the scoop portion.

In some examples, the first cavity is an indentation in the bottom surface of the scoop portion and the second cavity is an indentation in the bottom surface of the scoop portion.

In some examples, the first cavity is an indentation in the top surface of the scoop portion and the second cavity is an indentation in the top surface of the scoop portion.

Embodiments of the present invention also include methods of using a measuring apparatus, for example, the method may include obtaining a measuring apparatus, the measuring apparatus comprising: a scoop portion joined to a handle portion, where the scoop portion and the handle portion are either separate elements connected to each other or contiguous regions on a piece of a material comprising the measuring apparatus, the scoop portion comprising a top surface and a bottom surface; and the scoop portion comprising two or more cavities, where each cavity is a concave indentation in either the top surface or the bottom surface, and where each cavity is formed to accommodate a pre-defined volume of a substance to be measured. The method may also include holding the measuring apparatus by the handle portion. Based on the holding, the method may also include moving the scoop portion into a material such that at least one or more of the two or more cavities is filled with the material. The method may also include emptying the material filling the at least one of the two of more cavities into a receptacle.

Embodiments of the present invention include measuring apparatuses and a measuring apparatus may include: a scoop portion joined to a handle portion, the scoop portion comprising a top surface and a bottom surface. The scoop portion may comprise two cavities, where each cavity is a concave indentation in either the top surface or the bottom surface, where each cavity is formed to accommodate a pre-defined volume of a substance to be measured, where a pre-defined volume of the first cavity is different than a pre-defined volume of a second cavity.

In some examples of the measuring apparatus, the pre-defined volume of the first cavity is a teaspoon.

In some examples of the measuring apparatus, the pre-defined volume of the first cavity is a tablespoon.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A measuring apparatus comprising:
a scoop portion joined to a handle portion, wherein the scoop portion and the handle portion are either separate elements connected to each other or contiguous regions on a piece of a material comprising the measuring apparatus, the scoop portion comprising a top surface and a bottom surface;
the handle portion comprising a top surface and a bottom surface and a longitudinal axis between them, wherein the handle portion further comprises a hole through parallel portions of the top surface of the handle portion and the bottom surface of the handle portion, wherein the hole is sized to measure a portion size of an item, based on placing the item through the hole; and
the scoop portion comprising two or more cavities, wherein each cavity is a concave indentation in either the top surface or the bottom surface, and wherein each cavity is formed to accommodate a pre-defined volume of a substance to be measured.

2. The apparatus of claim 1, wherein the two or more cavities comprise a first cavity and a second cavity, the first cavity formed to accommodate a teaspoon of the substance to the measured, and the second cavity formed to accommodate a tablespoon of the substance to be measured.

3. The apparatus of claim 2, wherein the first cavity is an indentation in the top surface of the scoop portion and the second cavity is an indentation in the bottom surface of the scoop portion.

4. The apparatus of claim 2, wherein the first cavity is an indentation in the bottom surface of the scoop portion and the second cavity is an indentation in the bottom surface of the scoop portion.

5. The apparatus of claim 2, wherein the first cavity is an indentation in the top surface of the scoop portion and the second cavity is an indentation in the top surface of the scoop portion.

6. The apparatus of claim 1, wherein the scoop portion comprises a first end and a second end and a longitudinal axis connecting the first end to the second end, and wherein the first cavity and the second cavity are centered around the longitudinal axis.

7. The apparatus of claim 1, wherein the measuring apparatus comprises at least one material selected from the group consisting of: plastic, silicone, metal, wood, and ceramic.

8. The apparatus of claim 1, wherein the scoop portion and the handle portion are the separate elements connected to each other, wherein the scoop portion comprises an opening, and wherein the handle element is inserted into the opening and affixed inside the opening to join the scoop portion and the handle portion.

9. The apparatus of claim 1, wherein the handle element is affixed utilizing a material selected from the group consisting of: glue, epoxy, a fastener.

10. A measuring apparatus comprising:
a scoop portion joined to a handle portion, wherein the scoop portion and the handle portion are either separate elements connected to each other or contiguous regions on a piece of a material comprising the measuring apparatus, the scoop portion comprising a top surface and a bottom surface; and the scoop portion comprising two or more cavities, wherein each cavity is a concave indentation in either the top surface or the bottom surface, wherein each cavity is formed to accommodate a pre-defined volume of a substance to be measured, wherein scoop portion comprises a spatula, and wherein the handle portion is joined to the scoop portion along a central axis of the spatula, wherein the two or more cavities comprise two cavities, and wherein a first cavity of the two or more cavities is on a left side of the central axis of the spatula and wherein a second cavity of the one or more cavities is on a right side of the central axis of the spatula.

11. The measuring apparatus of claim 10, wherein the pre-defined volume of the first cavity is a teaspoon.

12. The measuring apparatus of claim 10, wherein the pre-defined volume of the first cavity is a tablespoon.

13. The apparatus of claim 10, wherein the two or more cavities comprise concave indentations in the top surface, and wherein the bottom surface of the scoop portion comprises convex portions at locations of the two or more cavities.

14. A measuring apparatus comprising:

a scoop portion joined to a handle portion, wherein the scoop portion and the handle portion are either separate elements connected to each other or contiguous regions on a piece of a material comprising the measuring apparatus, the scoop portion comprising a top surface and a bottom surface;

the scoop portion comprising two or more cavities, wherein each cavity is a concave indentation in either the top surface or the bottom surface, wherein each cavity is formed to accommodate a pre-defined volume of a substance to be measured, and wherein a portion of the top surface of the scoop portion and a portion of the bottom surface of the scoop portion are parallel to each other; and contiguous regions on the piece of the material.

\* \* \* \* \*